INVENTORS
Hoy E. West
Johnnie C. Collins

BY *Shley & Shley*

ATTORNEYS

Oct. 7, 1969    H. E. WEST ET AL    3,470,964
EARTH WORKING IMPLEMENTS AND LIFT-LATCH ASSEMBLY THEREFOR
Filed June 21, 1967    9 Sheets-Sheet 4

INVENTORS
Hoy E. West
Johnnie C. Collins

BY *Shley & Shley*

ATTORNEYS

INVENTORS
Hoy E. West
Johnnie C. Collins

BY *Ahley & Ahley*

ATTORNEYS

INVENTORS
Hoy E. West
Johnnie C. Collins

BY Shley & Shley

ATTORNEYS

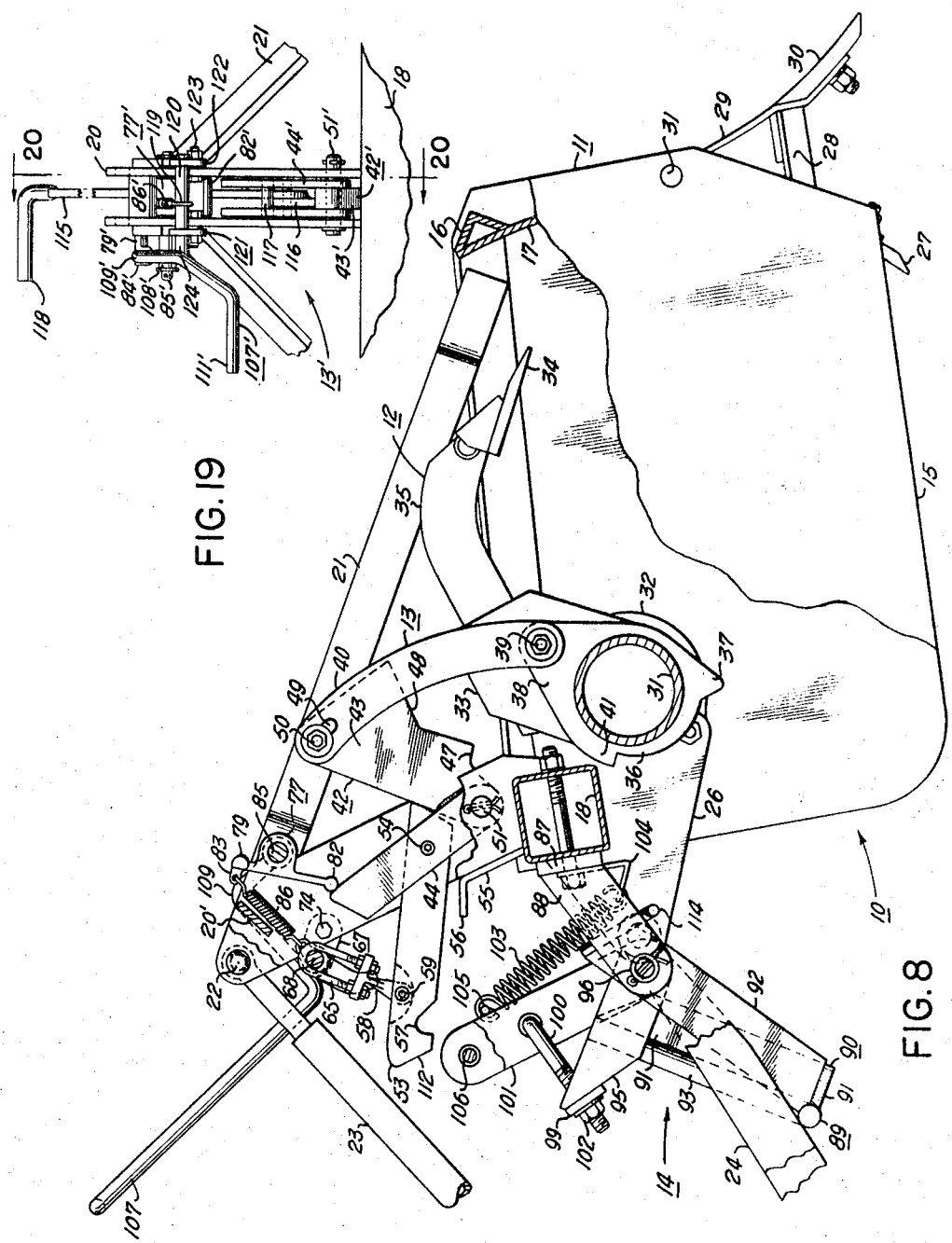

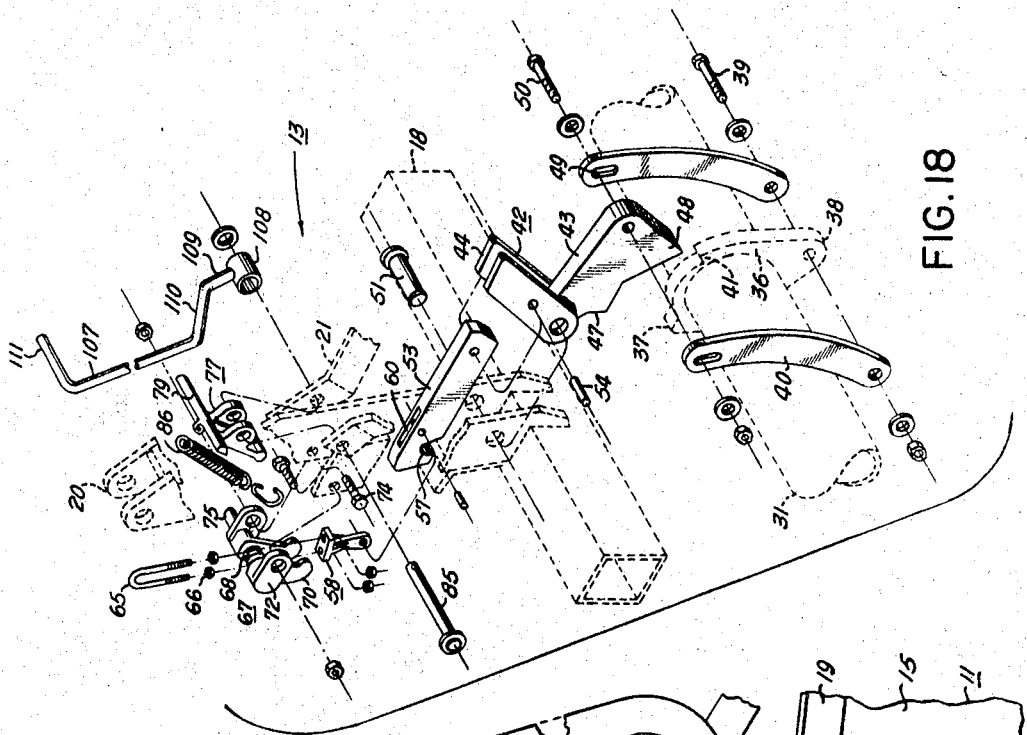

United States Patent Office 3,470,96[4]
Patented Oct. 7, 196[9]

3,470,964
EARTH WORKING IMPLEMENTS AND LIFT
LATCH ASSEMBLY THEREFOR
Hoy E. West and Johnnie C. Collins, Dallas, Tex., assignors to Servis Equipment Company, Dallas, Tex., a corporation of Texas
Filed June 21, 1967, Ser. No. 647,840
Int. Cl. A01b 49/02, 19/02
U.S. Cl. 172—197      25 Claims

ABSTRACT OF THE DISCLOSURE

An earth working implement for attachment to the top and lower links of a tractor rear lift mechanism which includes a scraper blade assembly, a scarifier assembly pivotally supported for movement between extended and retracted positions relative to the blade assembly, a lift-latch assembly for lifting the scarifier assembly and having means for latching the latter in such positions, and means for releasing the latching means to permit said scarifier assembly to pivot downwardly to its extended position. Optionally and preferably, the implement may include a crank assembly for coacting with the lift-latch assembly and tractor lower lift links and being connectable with said lift-latch assembly for pivoting the scarifier assembly from its extended to its retracted position upon lifting of said implement by the tractor mechanism; however, a lever may be provided in place of the crank assembly to permit manual lifting of said scarifier assembly.

BACKGROUND OF THE INVENTION

Field of the invention

Earth working implements of the type adapted to be attached to the links of a tractor rear lift mechanism and having a scarifier assembly pivotally supported for movement relative to a scraper blade assembly between extended operating position and retracted transport position.

Description of the prior art

Heretofore, earth working implements of this type have been of many varied constructions for actuating the scarifier assembly and for locking the same in its extended and retracted positions as well as for using the weight of said assembly to assist in lowering it relative to the scraper blade assembly. Usually, the scarifier actuating means of these implements have been manually operable and have not been entirely satisfactory and, when said actuating means have been automatic in operation, auxiliary power means have been required. In order to maintain the efficiency of the operator of the tractor at a maximum throughout a work period which may be of extended duration and/or under adverse weather and other conditions, it is highly desirable to automatically lift the scarifier assembly from its extended to its retracted position by utilizing the pivotal movement of the lower links of the tractor rear lift mechanism relative to the scraper blade assembly upon lifting of the latter by said mechanism. At the same time, it is advantageous to provide a structure which is readily adaptable to either automatic or manual lifting of the scarifier assembly. Examples of the prior art are:

| | | |
|---|---|---|
| 615,310 | 12/1898 | Sattley. |
| 1,113,806 | 10/1914 | Meidenbauer. |
| 1,457,878 | 6/1923 | Hopfield. |
| 1,628,799 | 5/1927 | Nordstog. |
| 2,839,851 | 6/1958 | Geiszler. |
| 2,840,935 | 7/1958 | Bird et al. |
| 2,865,117 | 12/1958 | Davis et al. |
| 3,069,791 | 12/1962 | French. |
| 3,101,790 | 8/1963 | Rice. |

Foreign

| | | |
|---|---|---|
| 880,228 | 6/1953 | Germany. |
| 302,838 | 1/1955 | Switzerland. |
| 82,670 | 12/1956 | Denmark. |

SUMMARY OF THE INVENTION

This invention relates to an earth working impleme[nt] for attachment to the top and lower links of a tract[or] rear lift mechanism which includes a scraper blade assem[b]bly having a generally rectangular frame with a sub[]stantially horizontal member extending transversely [of] its front end portion and a scarifier assembly pivotall[y] mounted on and extending rearwardly of the frame mem ber for swinging movement about a horizontal, transvers[e] axis between extended and retracted positions relativ[e] to the blade assembly. A lift-latch assembly is pivotall[y] mounted on the transverse frame member for lifting th[e] scarifier assembly from its extended to its retracte[d] position and includes a crank pivotally connected b[y] links to said scarifier assembly, the crank having a rea[r] ward portion for latching said scarifier assembly in i[ts] extended position and a forward portion for coactin[g] with a pivoted latch element for locking said scarifi[er] assembly in its retracted position. The latch element [is] mounted on the frame above the crank and is biased rea[r] wardly-downwardly for locking engagement with the fo[r] wardly swinging crank, and means is provided for r[e] leasing said latch element to permit the scarifier assembl[y] to pivot downwardly to its extended position. If desire[d,] a lever may be provided for manually lifting the scarifi[er] assembly by means of the crank. Optionally and prefer ably, however, the implement includes a crank assembl[y] for coacting with the lift-latch assembly and the lowe[r] links of the tractor rear lift mechanism, the crank an[d] lift-latch assemblies being connectable for pivoting th[e] scarifier assembly from its extended to its retracted pos[i]tion upon lifting of said implement by said tractor mech[a] nism. In addition, the lift-latch assembly may includ[e] means for disconnecting said assembly from the cran[k] assembly to prevent possible damage in the event th[at] the forward portion of the crank overtravels the latc[h] means as well as so positioning the connection means o[f] said lift-latch assembly that release of said latch mean[s] will permit downward pivoting of the scarifier assembl[y].

Constructions designed to carry out the invention wi[ll] be hereinafter described together with other features [of] the invention.

BRIEF DESCRIPTION OF THE DRAWINGS

FIG. 8 is a view, similar to FIG. 3, showing the implement and tractor lift links raised in transport position with the scarifier assembly locked in retracted position relative to the blade assembly, FIG. 14 is a perspective view of the scarifier control link, FIG. 15 is a perspective view of the latch for locking the scarifier in its retracted position, FIG. 17 is an exploded, perspective view of the crank or lift shaft assembly, FIG. 18 is an exploded, perspective view of the lift-latch assembly with adjacent portions of the implement being shown in broken lines, FIG. 19 is a fragmentary, front elevational view showing a manually-operable lift-latch assembly mounted on the implement, and FIG. 20 is a transverse, vertical, sectional view taken on the line 20—20 of FIG. 19, showing portions of the scarifier and blade assemblies in extended operating position.

DESCRIPTION OF THE PREFERRED EMBODIMENT

Figure 1:
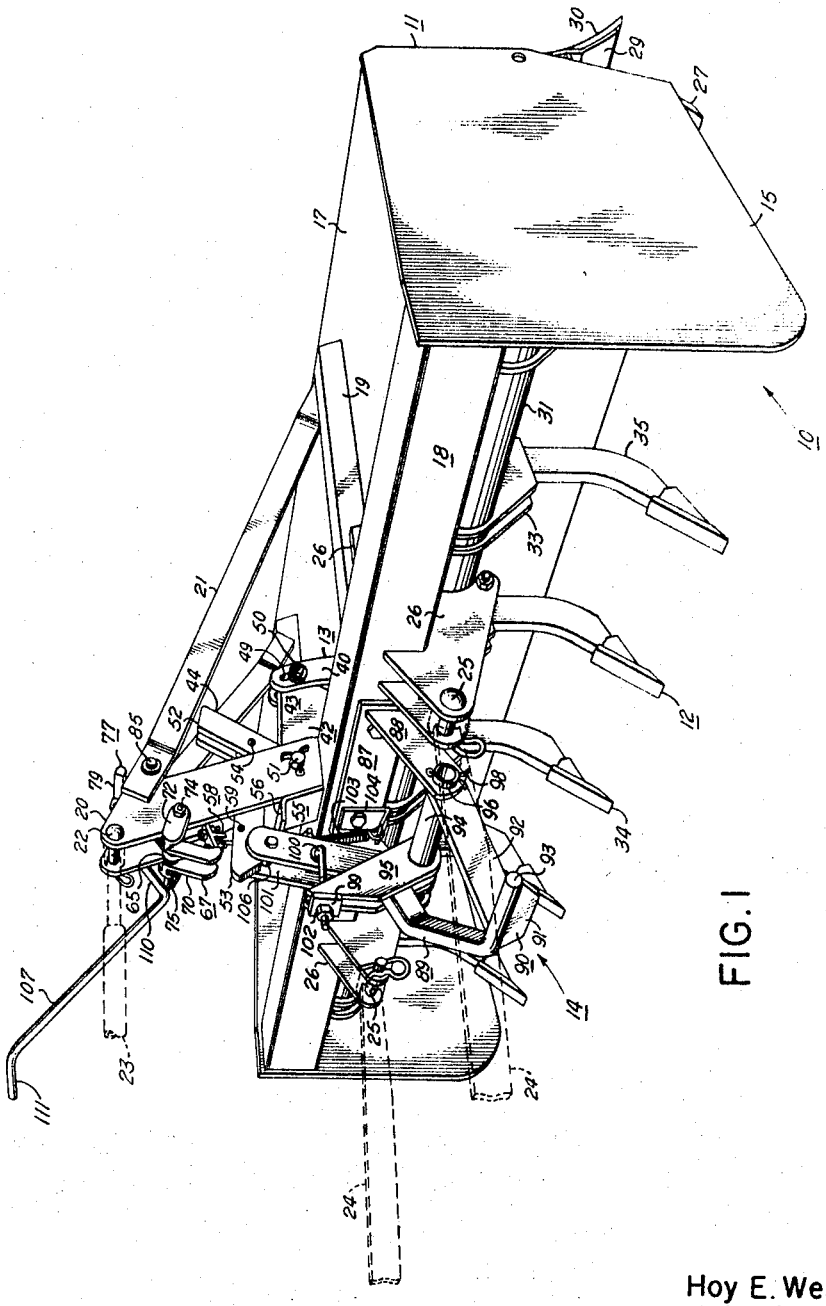
FIG. 1 is a front perspective view of an earth work[]ing implement constructed in accordance with the i[n]vention and having its scraper blade and scarifier assem[]blies in extended or lowered operating position, portio[ns] of the links of a conventional tractor rear lift mechanis[m] being shown in broken lines.
Figure 2:
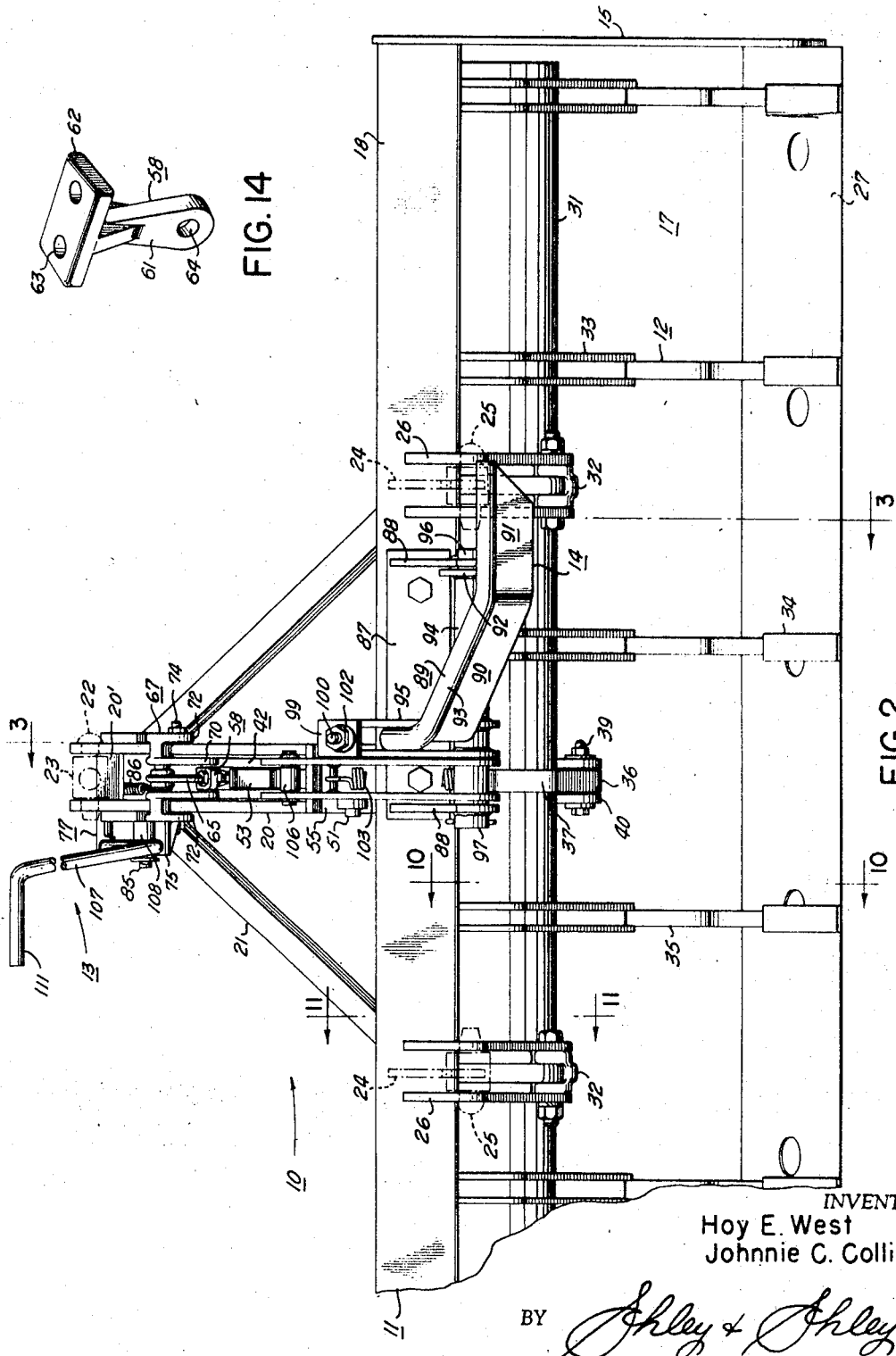
FIG. 2 is an enlarged, front elevational view of th[e] intermediate and one of the end portions of the impl[e]ment, the tractor lift links being shown in broken line[s,]
Figure 3:
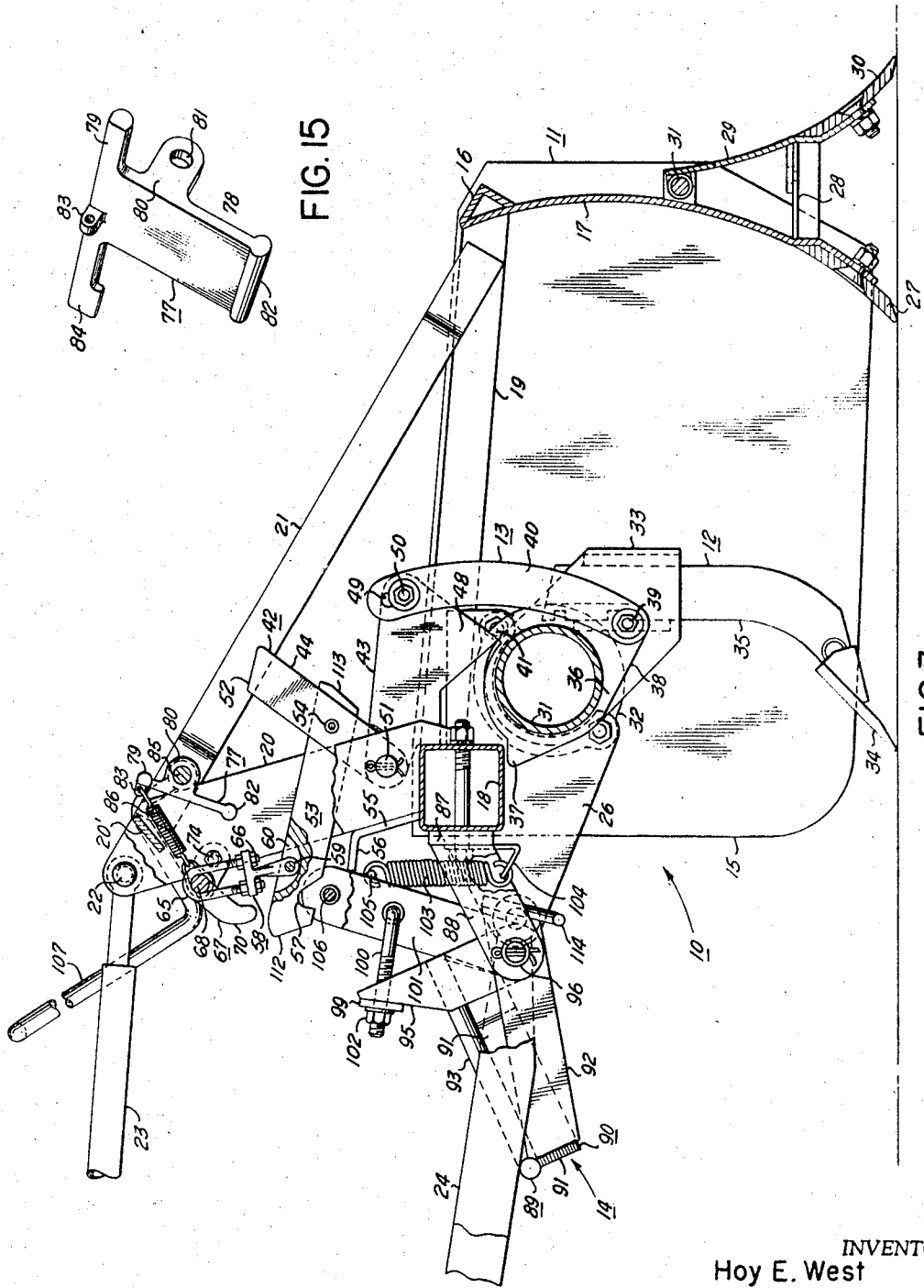
FIG. 3 is a transverse, vertical, sectional view take[n] on the line 3—3 of FIG. 2 and showing portions of th[e] tractor lift links.

In the drawings, the numeral 10 designates an earth working implement having a scraper blade assembly 11 (FIGS. 1–3 and 8), a scarifier assembly 12 (FIG. 10), a scarifier lift-latch assembly 13 (FIG. 18) and a crank or lift shaft assembly 14 (FIG. 17). The scrapper blade assembly 11 includes a pair of upright end plates or side members 15 connected at their rear portions by an upper, horizontal, transverse angle bar 16 and a scrapper blade member 17 and at their upper front portions by a horizontal box beam or transverse, tubular frame member 18 which is rectangular, preferably square, in cross-section (FIGS. 1–3). A pair of tubular reinforcing bars or members 19 extend between the upper margins of the scrapper blade member 17 and the beam 18 in parallel, preferably equally-spaced, relation to the end plates 15 and each other. The beam has a pair of forwardly-inclined, close-spaced flat members or bars 20 upstanding from its medial portion with their upper end portions reinforced by a cross plate 20' and connected by inclined, rearwardly-divergent brace members or bars 21 to the rear ends of the reinforcing bars 19. It is noted that elements 15–21 of the scraper blade assembly coact to form a frame for said assembly as well as for the entire implement 10 and that said frame has a general rectangular configuration. A horizontal, transverse pin 22 is journaled in the upper ends of the upright bars 20 for connection with the rear end of the top link 23 of a conventional tractor rear lift mechanism (not shown). The latter includes a pair of draft or lower links 24 which are adapted to have their rear ends connected by pivot pins 25, similar to the pin 22, to the front ends of two pairs of brackets 26 projecting forwardly and rearwardly from the beam 18 and secured thereto as well as to the reinforcing bars.

Due to this arrangement, the implement 10 may be raised and lowered relative to the tractor in the usual manner. A double edge, reversible blade 27 is fastened to the lower margin of the scraper blade member 17 which is curved about its longitudinal axis and which has a horizontal bar 28 projecting rearwardly from its lower portion. For pivotally supporting the mounting plate 29 of a double edge, reversible, backfill blade 30 at a rearward inclination, a horizontal hinge pin 31 extends transversely between the rear margins of the end plates 15 and is secured to the rear surface of the blade member above the bar 28 so that said mounting plate overlies the rear margin of said bar.

SCARIFIER ASSEMBLY 12

Figure 10:
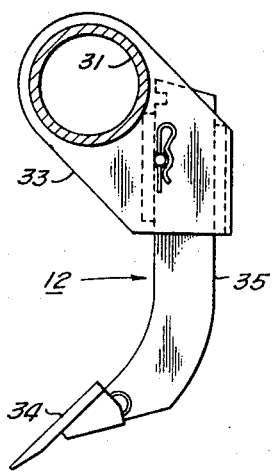
FIG. 10 is a transverse, vertical, sectional view, taken on the line 10—10 of FIG. 2, showing the mounting of one of the scarifier teeth.
Figure 11:
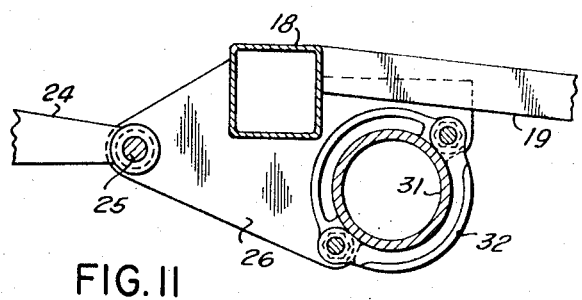
FIG. 11 is a transverse, vertical, sectional view, taken on the line 11—11 of FIG. 2, showing one of the brackets for rotatably supporting the scarifier assembly.

A horizontal, cylindrical member or shaft 31, preferably hollow or tubular, extends transversely between the end plates of the blade assembly 11 slightly below and rearwardly of the beam 18 for pivotally supporting the scarifier assembly and is journaled in split bearings 32 which are suitably fastened to the rear end portions of the pairs of brackets 26 (FIG. 11). The shaft 31 has a plurality of preferably equally-spaced hangers or socket elements 33 depending rearwardly therefrom for suspending a plurality of scarifier teeth 34 below said shaft. As best shown in FIG. 10, each scarifier tooth 34 includes an upright, flat arm or shank 35 having its upper end portion removably confined in one of the hangers 33.

Figure 12:
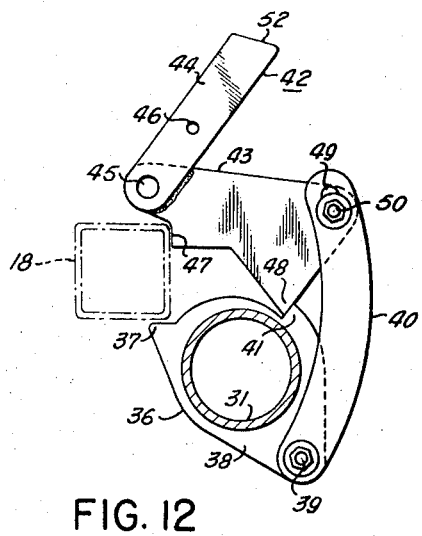
FIG. 12 is a side elevational view of a portion of the scarifier lift-latch assembly locked in its lowered position.

In order to prevent forward or clockwise swinging (FIGS. 3–6 and 12) of the scarifier assembly 12 past the substantially upright position of the depending scarifier arms 35 or extended position of said assembly, a collar 36 is secured to the medial portion of the shaft 31 and has an enlargement or lug 37 projecting forwardly therefrom for engaging the underside of the beam 18. Opposite the lug 37, the collar 36 has a rearward, downward projection or ear 38 pivotally attached at 39 to the lower ends of a pair of upstanding, arcuate or curved lift elements or links 40 which are disposed in side by side relationship and which form a part of the lift-latch assembly 13 (FIG. 18). For coacting with another portion of the latter assembly to prevent rearward and upward or counterclockwise pivoting of the scarifier assembly from its extended position (FIGS. 3–6) and as will be explained, another lug or projection 41 is formed on the upper rear portion of the collar between the lug and ear 38 (FIG. 12).

SCARIFIER LIFT-LATCH ASSEMBLY 13

The lift-latch assembly includes a crank 42 having a rearwardly extending portion or plate 43 and a pair of parallel upstanding portions or arms 44 secured at their lower ends to the front end of the plate on opposite sides thereof and rearwardly inclined at an acute angle thereto. As shown in FIG. 12, an opening 45 extends transversely through the alined, connected ends of the crank plate 43 and arms 44 and alined transverse openings 46, of smaller diameter, are formed in said arms above the opening 45. The plate of the crank 42 has a lower margin of irregular contour which includes a front, depending portion or shoulder 47 for engaging the upper portion of the rear surface of the beam 18 (FIG. 6) and an enlarged, rear depending portion or bill 48 for substantially simultaneous engagement with the lug 41 of the collar 36. It is noted that the latter lug and bill 48 have flat, coacting surfaces which prevent rearward and upward swinging of the scarifier assembly 12 when the surfaces are in contact and which are so oriented as to facilitate engagement and disengagement thereof.

Alined slots 49 extend longitudinally of the upper end portions of the links 40 for loose connection by a transverse pivot pin 50 to the rear upper end of the crank plate 43, whereby the crank may be pivoted forwardly-upwardly or counterclockwise an amount sufficient to disengage the coacting surfaces of the lug 41 and bill 48 before rearward-upward or counterclockwise lifting movement of the scarifier assembly 12. The crank 42 is pivotally mounted with its front end portion overlying the beam 18 by a pivot pin 51 which extends through the opening 45 of said crank and transversely through the lower portions of the pair of upstanding bars 20 of the blade assembly 11 (FIGS. 3–9). For a purpose which will be apparent, the upper end surfaces 52 of the crank arms 44 are inclined or slope upwardly at an acute angle to the rear margins of said arms.

Figure 4:
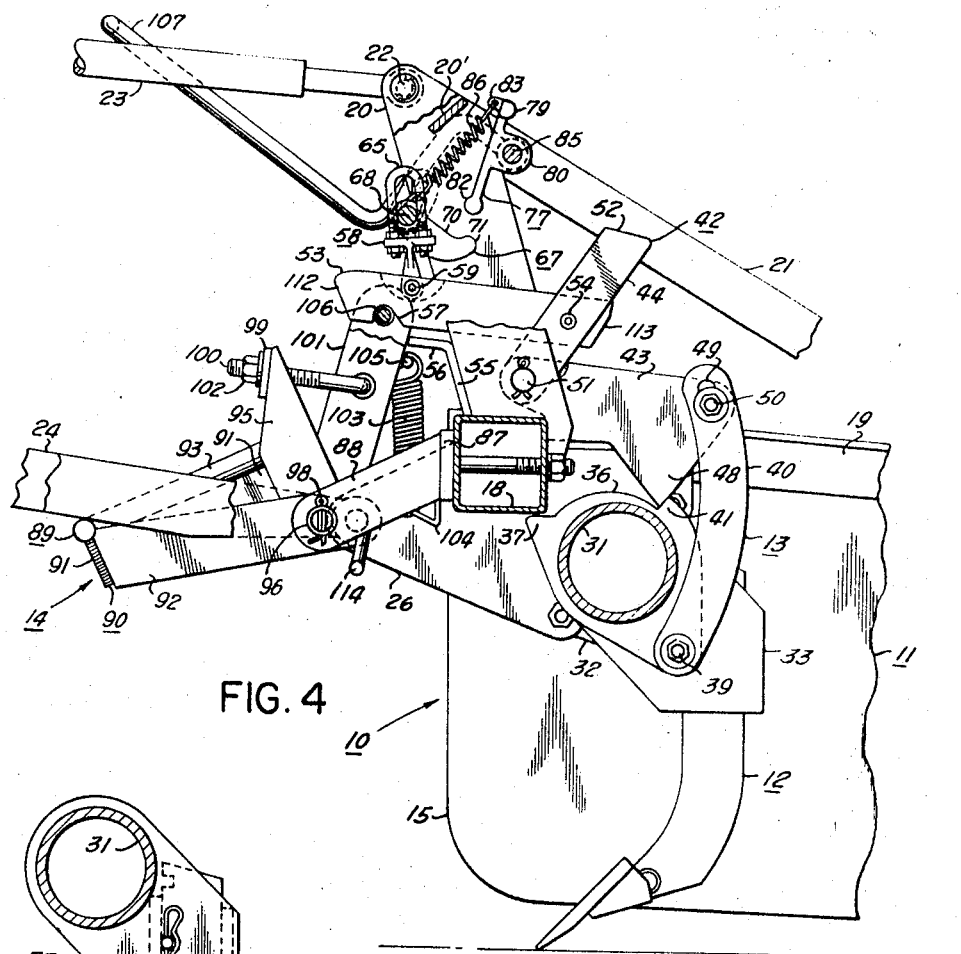
FIG. 4 is a view, similar to FIG. 3 but omitting th[e] rear portions of the scraper blade assembly, showing th[e] control lever of the scarifier lift-latch assembly lowere[d] to permit the hook link of said assembly to engage th[e] latch pin of the latch arm of the crank or lift sha[ft] assembly.
Figure 5:
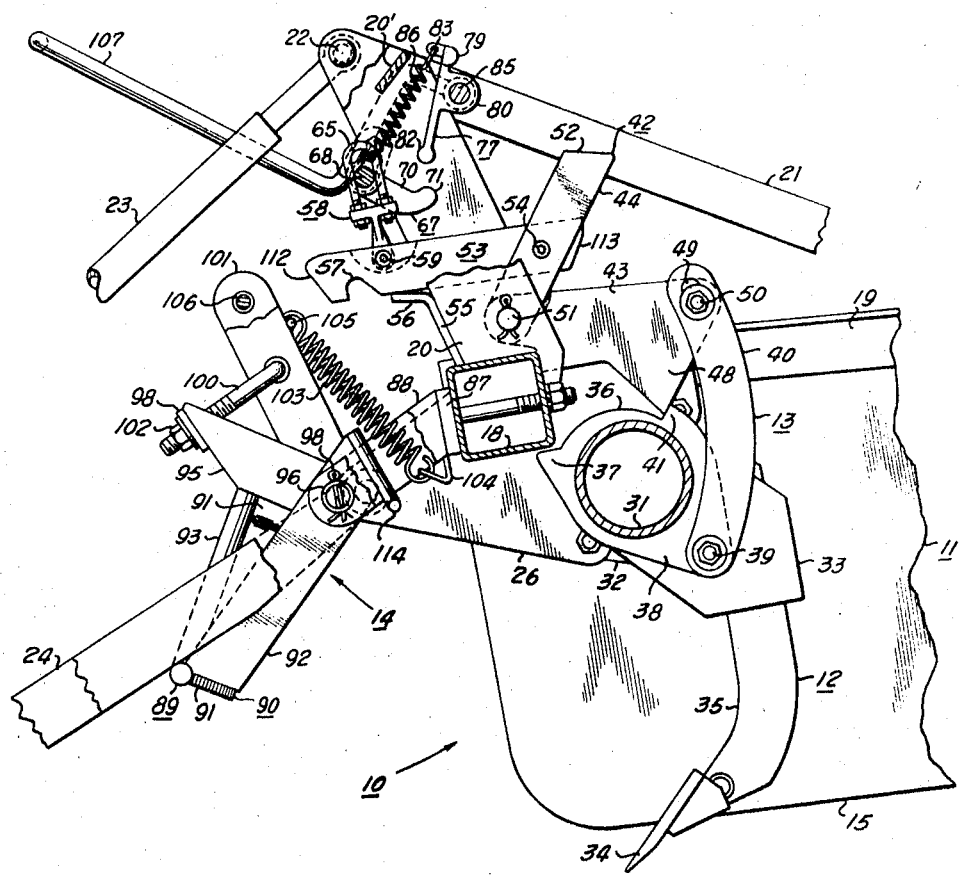
FIG. 5 is a view, similar to FIG. 4, showing the implement and tractor lift links raised with the scarifier assembly extended relative to the blade assembly.

A hook bar or link 53, forming a part of the lift-latch assembly 13, has its rear end portion pivotally connected to the crank arms 44 by a transverse pivot pin 54, which extends through the openings 46 (FIG. 12) of said arms, and projects forwardly of the upstanding bars 20 in overlying relation to the pivotal mounting 51 of the crank 42 (FIGS. 3–9). The forwardly-projecting front end portion of the hook link 53 is adapted to be supported, as shown in FIG. 5, by an angular stop element or plate 55 which overlies and is secured to the front margins of the bars 20 and which has an upper, forwardly-projecting flange or portion 56. Ahead of the stop plate 55, a notch or slot 57 is formed in the underside of the hook link for engagement with a portion of the lift shaft assembly 14, as will be explained. The front end portion of the hook link 53 is suspended from the lower end of a control link 58 by a pivot pin 59, which extends transversely through said link above and rearwardly of the notch 57, and has an arcuate, upwardly-facing, longitudinal recess 60 for receiving and permitting relative movement of the control link. As best shown in FIG. 14, the latter is substantially T-shaped and has an upright leg 61 depending from an upwardly-facing, flat, transverse head 62 which has a pair of openings 63 therein. A transverse opening 64 extends through the lower end portion of the leg 61 of the control link 58 for receiving the pivot pin 59.

Figure 13:
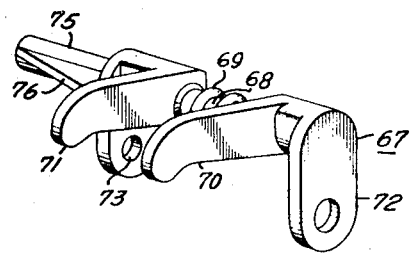
FIG. 13 is a perspective view of the scarifier lift control bracket.

The depending legs of a U-bolt 65, forming a part of the lift-latch assembly 13, have their lower ends adjustably confined in the openings 63 of the control link head 62 by coacting nuts 66 whereby the U-bolt upstands therefrom for loose connection with a lift control bracket 67. As most clearly shown in FIG. 13, the lift control bracket 67 includes a horizontal, transversely-extending, medial portion or gudgeon 68 having a pair of peripheral enlargements or shoulders 69 for confining the bight portion of the U-bolt 65 therebetween. A cam arm 70, having a rearward-directed cam lobe or projection 71 on its outer end, depends from each end of the gudgeon 68, while a link 72 projects from the inner end of each cam arm in spaced, parallel relation and at slightly greater than a right angle thereto. The control bracket links 72 have transverse openings 73 in their outer ends for pivotal connection by pins 74, each of which extends transversely through the upper end portion of one of the upstanding bars 20 below the pin 22 whereby the control bracket may pivot between the position shown in FIGS. 1–3, 8 and 16 and the position shown in FIGS. 4–7, an intermediate position being shown in FIG. 9. A pintle 75 projects from one end (right side of implement) of the control bracket 67 in axial alinement with the gudgeon and may be reinforced by a gusset 76.

Figure 9:
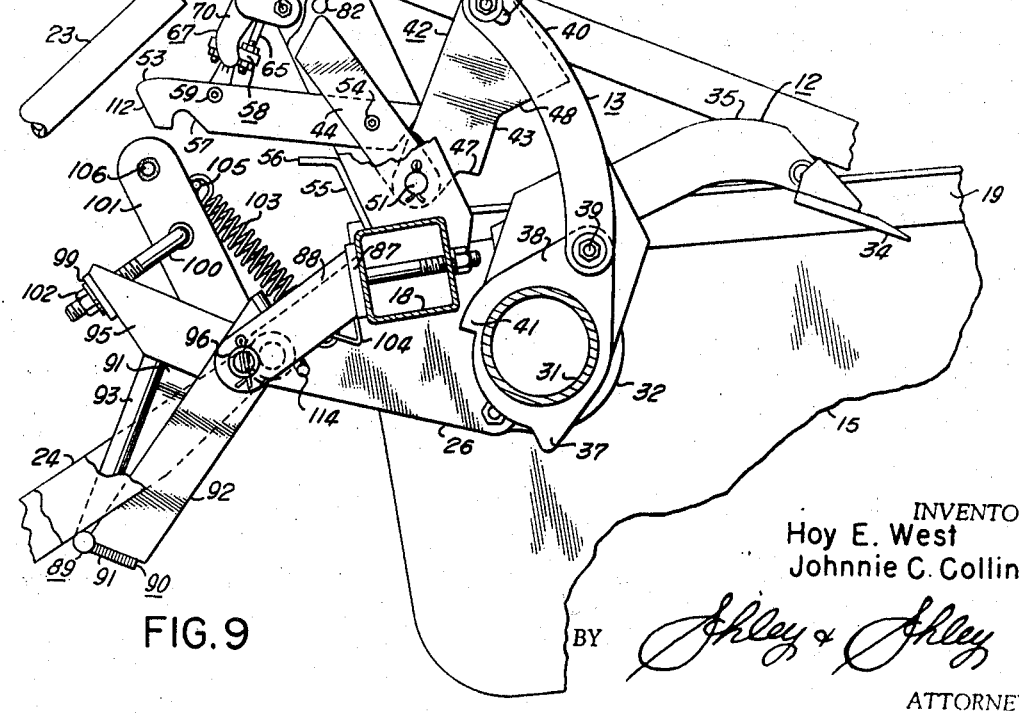
FIG. 9 is a view, similar to FIG. 4, showing the control handle of the scarifier lift-latch assembly raised to permit dropping of the scarifier assembly to the position shown in FIG. 5.

The lift-latch assembly 13 also includes a latch element 77 for the crank 42 which is T-shaped and which has a broad, flat, plate-like body or leg 78 depending from a transverse head 79 of relatively small cross-section (FIG. 15). A pair of spaced, parallel ears or lugs 80 projects rearwardly from the upper portions of the upright margins of the leg 78 and has alined openings 81 for pivotally supporting the latch element 77. Preferably, the lower margin of the latch leg is in the form of an enlarged cylindrical bead 82, while an apertured ear or lug 83 projects forwardly from the intermediate portion of the latch head 79 which has one (right hand) of its end portions elongated and enlarged as shown at 84. The latch element is suspended by its openings 81 from a pivot pin 85 which extends transversely between the upper end portions of the inclined brace bars 21 of the scraper blade assembly 11 (FIGS. 1, 3–9 and 16) whereby the leg 78 depends between the upright bars 20 of said assembly and the head of said latch element overlies said brace bars with the elongated and enlarged end portion 84 of said head projecting laterally outward of one (right hand) of said latter bars. For urging the latch head 79 into engagement with the brace bars, a helical control spring 86 connects the apertured ear 83 to the gudgeon 68 of the lift control bracket 67. As will be apparent, the bead 82 of the latch 77 of the latch element is adapted to coact with the upper end surfaces 52 of the crank arms 44 (FIGS. 7–9).

CRANK OR LIFT SHAFT ASSEMBLY 14

Figures 6, 16:
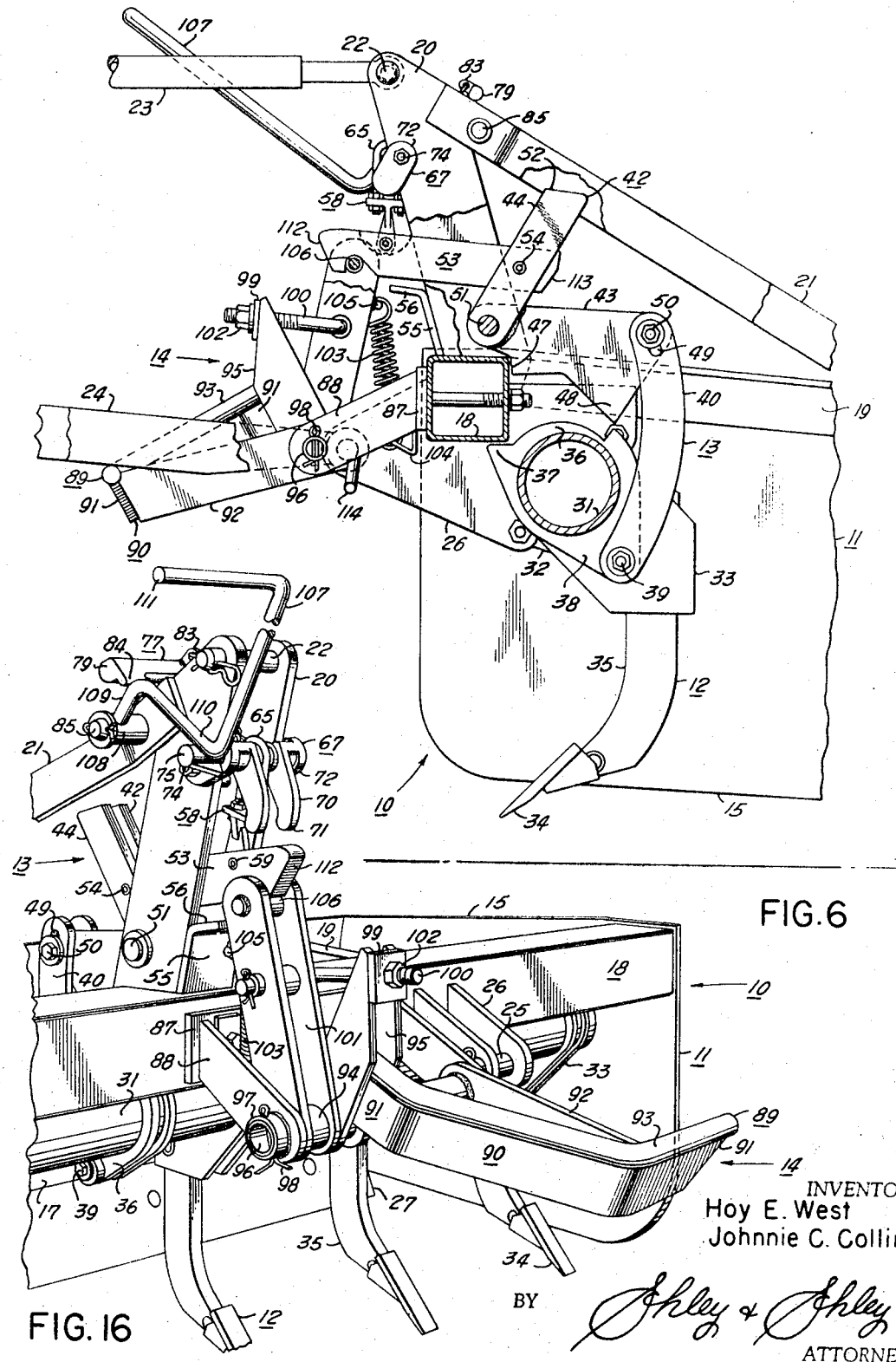
FIG. 6 is a view, similar to FIG. 4, showing the initial movement of the scarifier assembly relative to the blade assembly upon raising of the implement and tractor lift links.
FIG. 16 is a front perspective view of a portion of the implement with the blade and scarifier assemblies in lowered or extended operating position.
Figure 7:
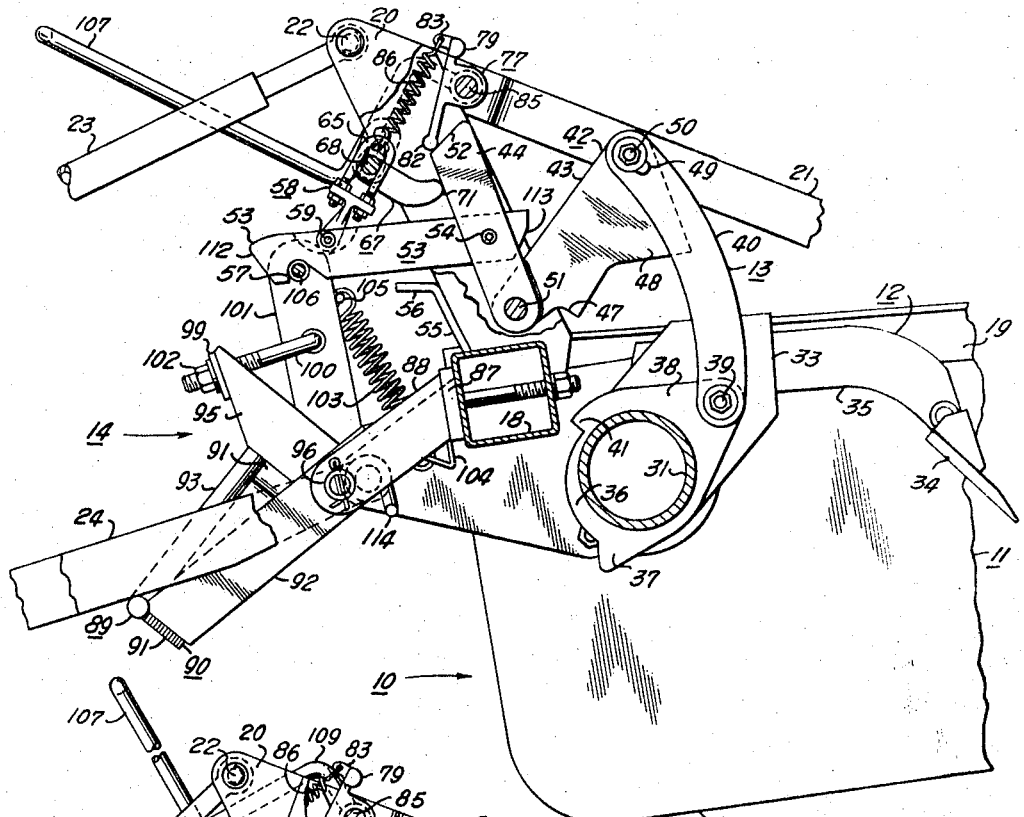
FIG. 7 is a view, similar to FIG. 4, showing the relative positions of the assemblies upon continued raising of the implement and tractor lift links.

The crank or lift shaft assembly includes a horizontal U-shaped mounting bracket or hanger 87 secured to and projecting forwardly from the medial portion of the front surface of the beam 18, as is best shown in FIGS. 1 and 16, and having downwardly-inclined, widely-spaced arms 88. A yoke 89 is adapted to be supported by the apertured front or outer ends of the arms 88 of the hanger 87 and includes a substantially U-shaped, flat bar 90 having outwardly-divergent, widely-spaced end portions or legs 91 in perpendicular relationship with a downwardly-inclined flat bar or arm 92 projecting rearwardly from the inner portion of one (left side of implement) of the legs in parallel relation to the other leg (FIG. 17). Preferably the upper margin of the U-shaped bar 90 is reinforced by a coextensive rod 93. The outer or rear end of the right hand yoke leg 91 and the outer or rear end portion of the yoke arm 92 have a horizontal cylindrical sleeve or tubular member 94 extending therebetween and connected thereto and of a length substantially equal to the distance between the hanger arms, said yoke leg being secured to and between the medial portions of a pair of flat arms or bars 95 upstanding from and inclined forwardly of the sleeve in spaced relation to its right hand end.

A complementary tubular member or shaft 96 is rotatably confined in the sleeve 94 and is of greater length so as to project beyond the ends thereof as well as the hanger arms 88, through the apertured, front or outer ends of which it is adapted to extend (FIGS. 2 and 16). The right hand hanger arm has a circular, transverse collar 97 secured to its outer surface in alinement with its aperture for receiving one of the projecting ends of the crank shaft 96 which is fastened against displacement and rotation by cotter pins 98 extending through said projecting ends and the collar. Since the right hand leg 91 of the yoke 89 extends at a right angle to the beam 18, the left hand leg of said yoke is substantially parallel to said beam and extends laterally outward for engagement with the underside of the left hand tractor draft link 24 whereby the crank assembly 14 is articulated or revolves upwardly-forwardly or counterclockwise upon raising of the tractor lift links and the downwardly-rearwardly or clockwise movement of said assembly is limited by the position of said lift links. It is noted that the yoke and its upstanding bars 95 coact to provide a bell crank for transmitting the pivotal movement of the tractor lift links to the lift-latch assembly 13.

An apertured plate 99 extends transversely between and is secured to the upper ends of the upstanding yoke bars 95 for adjustable connection by an angular, rearwardly extending rod 100 to the intermediate portions of a pair of upstanding latch arms 101 which have their lower ends rotatably confined on the sleeve 94 between said yoke bars and the adjacent arm 88 of the bracket 87 (FIGS. 2 and 16). The rod 100 is slidable through the plate 99 and has a nut 102 screw-threaded on its front end for controlling the rearward movement of the latch arms 101 relative to the yoke 89. A helical latch spring 103, having its lower end connected by an angular clip 104 to the front surface of the beam 18 of the scraper blade assembly 11, has its upper end attached to a transverse rod 105 secured to the rear margins of the latch arms for urging said arms rearwardly in acute angular relation to the upstanding yoke bars as well as maintain the left hand yoke leg 91 (FIG. 17) in engagement with the overlying lower draft link. The upper ends of the latch arms 101 have a horizontal latch pin 106 extending transversely therebetween for engagement with the notch 57 in the underside of the front end portion of the hook link 53 (FIGS. 4, 6 and 7).

OPERATION

For actuating the lift control bracket 67 as well as the latch element 77, an angular, forwardly-upwardly extending control lever 107 is rotatably mounted, externally of one (right side of implement) of the brace bars 21, by a transverse collar 108 at its inner or rear end on one end (right hand) of the pin 85 which pivotally suspends said latch element and which projects laterally outward of one (right hand) of said brace bars (FIGS. 2 and 16). The lever 107 has an angular inner or rear portion 109 for underlying and bearing against the enlarged, elongated end 84 of the latch head 79 and an angular intermediate portion 110 for resting on the pintle 75 of the lift control bracket 67. A handle 111 projects laterally outward from the outer or front end of the lever to facilitate manual swinging thereof.

The scarifier assembly 12 is adapted to be locked in its extended or lowered operating position by the engagement of the lug 37 of the medial collar 36 of the shaft 31 of said assembly with the underside of the beam 18 of the lowered scraper blade assembly 11 and by the engagement of the bill 48 of the plate 43 of the crank 42 of the lift-latch assembly 13 with the lug 41 of said collar as shown in FIGS. 1–3 and 12, the shoulder 47 of said crank plate engaging the rear surface of said beam. The control lever 107 is in neutral or nonoperating position whereby the control spring 86 urges the lift control bracket 67 clockwise and its gudgeon 68 upwardly and forwardly of the centerline of the pivotal mounting 74 of said bracket so as to hold the hook link 53 in its upper position with its underside notch 57 disengaged from the latch pin 106 of the latch arms 101 of the lift shaft assembly 14 (FIG. 3). Also, the force of the control spring urges the latch element 77 counterclockwise for holding its head 79 in overlying engagement with the brace bars 21. When the scraper blade assembly is raised (FIGS. 5 and 7) and lowered (FIGS. 1–3) by the tractor rear lift links 23 and 24, the latch arms oscillate about the common axis of the sleeve 94 and shaft 96 of the yoke 89 of the lift shaft assembly.

In order to raise the scarifier assembly 12 from operating position (FIGS. 1–3) to transport position, the control lever 107 is swung forwardly-downwardly or counterclockwise (FIG. 4) so as to force the lift control bracket 67 to revolve in the same direction or downwardly and dispose its gudgeon 68 below the centerline of the pivotal mounting of said bracket. Since the control spring 86 has its lower end fastened to the gudgeon, the force of said spring holds the lift control bracket in this lowered position and permits the hook link 53 to pivot downwardly or counterclockwise by gravity for engagement of its notch 57 with the latch pin 106. This engagement is direct when the blade assembly 11 is in its lowered position. If the scraper blade assembly is in its raised position as shown in FIG. 5 when the control lever is lowered, the crank assembly 14 is in its forward position and the hook link comes to rest on the flange 56 of the stop plate 55. Upon subsequent lowering of the blade assembly 11 by the tractor lift links 23 and 24, the force of the latch spring 103 pivots the latch arms rearwardly or clockwise to engage the latch pin with the notch of the hook link 53 (FIG. 4). As shown by the numeral 112, the front end of the hook link is inclined rearwardly-downwardly to permit the latch pin 106 to ride thereover.

When the scraper blade assembly is raised by the tractor rear lift mechanism, the yoke 89 of the crank or lift shaft assembly 14 is forced to articulate or revolve counterclockwise or downwardly-rearwardly relative to said blade assembly (FIG. 6) due to the engagement of the transverse yoke leg 91 beneath one (left side of implement) of draft links 24 whereby the latch arms 101 are swung counterclockwise or forwardly and transmit this movement through the latch pin 106 and hook link 53 to the crank 42 of the scarifier lift-latch assembly 13. The slots 49 in the upper end portions of the lift links 40 permit the lift crank to pivot counterclockwise or upwardly relative to said links for raising the bill 48 of said crank out of engagement with the lug 41 of the collar 36 of the shaft 31 of the scarifier assembly 12 before the pivot pin 50 reaches the upper ends of said slots and commences to raise said assembly. As shown in FIGS. 7 and 8, this movement continues until the inclined upper end surfaces 52 of the crank arms 44 engage and slide forwardly past the lower end 82 of the latch element 77 which pivots clockwise to accommodate such movement and which is then pivoted counterclockwise by the force of the control spring 86 to engage said latch lower end with the rear margins of said crank arms for locking the scarifier assembly in its raised or transport position. This locking engagement should occur at the upper travel limit of the tractor rear lift mechanism if the angular relationship of the latch arms 101 to the bars 95 of the yoke 89 is properly adjusted by means of the nut 102 of the connecting rod 100.

The lobes 71 of the cam arms 70 of the scarifier lift control bracket 67 extend rearwardly below the latch element 77 upon counterclockwise pivoting of said bracket by forwardly-downwardly or counterclockwise swinging of the control lever 107 (FIG. 4). Accordingly, when the arms 44 of the lift crank 24 approach engagement with the latch element, the front margins of said crank arms contact the cam lobes so as to revolve the lift control bracket clockwise toward its upper or neutral position. The terminal portion of this movement of the bracket 67 is assisted by the force of the control spring 86 when the lower end of the latter moves forwardly past the centerline of the pivotal mounting of said bracket and the force of the latch pin 106 against the hook line 53 is released (FIG. 8). Of course, the upper ends of the crank arms move forwardly past the lower end 82 of the latch element into locking engagement therewith before disengagement of the hook link and latch pin.

In the event that the length of the connecting rod 100 is improperly adjusted whereby the locking engagement of the lift crank arms 44 with the latch element 77 fails to coincide with the upper limit of the tractor rear lift mechanism, the travel of the lift shaft assembly 14 may be excessive and cause damage. In order to prevent possible damage, the hook link 53 is adapted to be disengaged from the pin 106 of the latch arms 101. Since the crank arms remain in engagement with the lobes 71 of the cam arms 70 upon travel of said crank arms beyond latch engaging position, the lift control bracket 67 is forced to revolve clockwise so as to move its gudgeon 68 upwardly within the U-bolt 65 until it strikes the bight portion of said U-bolt. Continued movement lifts the U-bolt as well as the control link 58 and thereby pulls the hook link out of engagement with the latch pin.

Manifestly, the extent of movement of the control bracket relative to the U-bolt 65 may be varied by adjusting the effective length of said U-bolt by means of its nuts 66. Due to its forced release from the latch pin 106, the hook link 53 pivots upwardly rather forcibly and could possible damage the mechanism thereabove. For preventing the released hook link from striking the overlying mechanism, its upward pivotal movement is restricted by extending its rear end beyond the pivot pin 54 for engagement with the forwardly-positioned upper margin of the crank plate 43 (FIG. 8). As shown by the numeral 113, the lower portion of the rear end of the hook link 53 is relieved to permit limited clockwise movement sufficient to permit disengagement of said link from the latch pin.

When it is desired to lower the scarifier assembly 12, the control lever 107 is swung rearwardly-upwardly or clockwise to engage its rear portion 109 with the elongated, enlarged end portion 84 of the head 79 of the latch element 77. This movement forces the latch element to pivot in the same direction and thereby disengage the bead 82 at the lower end of its leg 78 from the upstanding arms 44 of the scarifier lift crank 42 (FIG. 9). Upon this release of the crank, the scarifier assembly swings downwardly or clockwise by gravity. When the scarifier assembly reaches its operating position, the lug 37 of the shaft collar 36 strikes the under side of the beam 18 and the bill 48 of the crank plate 43 drops into engagement with the lug 41 of said collar for locking said assembly against movement relative to the scraper blade assembly 11 (FIGS. 1–3), the shoulder 47 of said crank plate simultaneously engaging the rear surface of said beam. If desired, the rearwardly-projecting end of the yoke arm 92 may have an angular, rod-like element or finger 114 extending laterally outward therefrom for engagement with the underside of the adjacent arm 88 of the crank shaft hanger 87 to limit counterclockwise articulation of the crank assembly 14 and consequent excessive stressing of the latch spring 103.

A DESCRIPTION OF A MODIFICATION

As shown in FIGS. 19 and 20, the scarifier assembly 12 may be lifted from its extended to its retracted position and latched in both positions by a manually operable lift-latch assembly 13' which is somewhat similar to the assembly 13. The manual lift-latch assembly 13' includes curved links 40', a lift crank 42' having a rearwardly-extending plate 43' and upstanding arms 44', a latch element 77', a control spring 86' and a control lever 107', all of which are substantially identical to and function in substantially the same manner as the links 40, crank 42, latch element 77, control spring 86 and control lever 107 of the assembly 13, respectively. It is noted that the entire crank or lift shaft assembly 14 as well as the hook link 53, stop plate 55, control link 58, U-bolt 65 and control bracket 67 are omitted and that pivot pins 39' and 50', respectively, connect the lower and upper ends of the links 40' to the collar 36 of the scarifier assembly and to the rear upper end of the crank plate 43', the upper end portions of said links having slots 49' for receiving the pin 50' and permitting relative movement of the crank 42'. A pivot pin 51' supports the crank between the lower portions of the upstanding bars 20 of the blade assembly 11, while a pivot pin 54' connects one end of an angular, upstanding lift lever 115 to the intermediate portions of the crank arms 44' (FIG. 20). Depending from this inner end of the manual lift lever 115 is an ear or lug 116 for engaging the upper margin of the crank plate to limit rearward swinging of said lever as well as to support the latter in its rearward position. A rod-like element or finger 117 projects laterally from the inner end portion of the lift lever for bearing against the rear margins of the crank arms whereby said lever is fixed relative to the crank 42'. The outer portion of the lift lever 115, which upstands when said lever is in its rearward position, has an angular handle 118 projecting laterally from its extremity to facilitate manual swinging of said lever.

The upper end surfaces 52' of the crank arms 44' are adapted to coact with the lower end bead 82' of the latch element 77' which is pivotally supported by the coaction of its apertured rear ears 80' and a pin 85', similar to the pin 85, between the upper end portions of the inclined brace bars 22 of the blade assembly (FIG. 20). A helical spring 86', similar to the spring 86, has its upper end attached to the front apertured ear 83' of the latch element for maintaining its transverse head 79' in engagement with the brace bars and resisting clockwise movement of said latch element as well as permitting locking engagement of the crank arms with the lower end of said element upon manual forward swinging of the lift lever 115. The lower end of the spring 86' is fastened by a hook 119 to the medial portion of the cross bar or rod 120 of a U-shaped clip 121 which has a pair of parallel links 122 secured to the front marginal portions of the upper end portions of the upstanding bars 20 of the blade assembly 11 by suitable fasteners 123. As shown by the numeral 124 in FIG. 19, one end (right side of implement) of the cross rod 120 projects laterally of the clip 121 so as to support the control lever 107'. The latter is similar to the control lever 107 of the assembly 13 in that it has a transverse collar 108' at its inner or rear end rotatably confined on the projecting end of the pin 85' which pivotally suspends the latch element 77', an angular inner or rear portion 109' for underlying and bearing against the enlarged, elongated end 84' of the latch head 79', an angular intermediate portion 110' for resting on the projecting end 124 of the clip cross rod 120, and a laterally projecting handle 111' at its outer or front end. It is noted that the control levers actuate the latch elements in exactly the same manner to release the lift cranks and permit falling of the scarifier assembly 12 to its extended position by gravity, the lift lever 115 swinging rearwardly and downwardly with said assembly.

The foregoing description of the invention is explanatory thereof and various changes in the size, shape and materials, as well as in the details of the illustrated construction may be made, without departing from the spirit of the invention.

We claim:

1. An earth working implement for attachment to a tractor rear lift mechanism having a top link and a pair of lower links including a scraper blade assembly having frame means at least at its front portion, support means upstanding from the frame means of the scraper blade assembly for pivotal connection with the top link of the tractor rear lift mechanism, support means extending forwardly of said frame means of said blade assembly on each side of the upstanding means of said frame means for pivotal connection with one of the lower links of the tractor rear lift mechanism, a scarifier assembly pivotally mounted on and extending rearwardly of said frame means for swinging movement about a transverse axis between extended and retracted positions relative to said scraper blade assembly, first shoulder means extending laterally from the pivot axis of the scarifier assembly for engagement with a transverse portion of said frame means to limit downward swinging of said scarifier assembly relative to said blade assembly, a lift-latch assembly for raising said scarifier assembly from its relative extended to its relative retracted position and for locking said scarifier assembly in the latter position, the lift-latch assembly including angular crank means pivotally mounted by its apex portion on the frame means for movement about a transverse axis substantially parallel to an above said pivot axis of said scarifier assembly and having front and rear portions extending from the apex portion in angular relation to each other with the rear portion overlying said scarifier assembly pivot axis, said lift-latch assembly including link means extending between and pivotally connected to the rear portion of the angular crank means and said scarifier assembly for swinging said assembly upwardly upon forward swinging of said crank means, second shoulder means extending laterally from said scarifier assembly pivot axis for engagement with said rear portion of said crank means upon engagement of the first shoulder means with said frame means to prevent upward swinging of said scarifier assembly whereby the first and second shoulder means coact with each other to maintain said scarifier assembly in its extended position, actuating means for pivoting said crank means upwardly-forwardly to raise said scarifier assembly from its extended to its retracted position, said lift-latch assembly including latch means pivotally mounted for movement about a transverse axis substantially parallel to and above said scarifier assembly pivot axis for coacting with the front portion of said crank means upon upward swinging of the latter to lock said scarifier assembly in its retracted position, said lift-latch assembly including resilient means for maintaining the latch means in position for engagement by said front portion of said crank means upon upward-forward movement thereof and permitting upward pivoting of said latch means, and means for actuating said latch means to release the same from engagement with said crank means front portion to permit said scarifier assembly to pivot downwardly to its extended position.

2. An earth working implement as set forth in claim 1 including means for pivotally supporting the latch actuating means for movement about the transverse pivot axis of the latch means of the lift-latch assembly, said latch actuating means having a portion for engaging and pivoting said latch means upwardly against the resistance of the resilient means of said lift-latch assembly to release the engaged front portion of the crank means and permit downward swinging of the scarifier assembly to its extended position.

3. An earth working implement as set forth in claim 1 wherein the latch means of the lift-latch assembly includes an element having upper and lower end portions with its transverse pivot axis therebetween, the frame of the scraper blade assembly having means engageable by the upper end portion of the latch element to limit downward pivoting of said element, the front portion of the angular crank means of said lift-latch assembly being engageable with the lower end portion of said latch element whereby said element pivots upwardly to permit said crank means front portion to move forwardly thereof into locking engagement therewith.

4. An earth working implement as set forth in claim 3 including means pivotally supporting the latch actuating means for movement about a transverse axis substantially parallel to the pivot axis of the latch element of the lift-latch assembly, said latch actuating means having a portion for engaging the upper end portion of said latch element to pivot said element upwardly against the resistance of the resilient means of said lift-latch assembly to release the front portion of the angular crank means of said assembly and thereby permit downward swinging of the scarifier assembly to its extended position.

5. An earth working implement as set forth in claim 1 including lost motion means pivotally connecting the rear portion of the angular crank means to the link means of the lift-latch assembly for permitting forward pivoting of said crank means relative to said link means upon initial lifting movement of said assembly to allow disengagement of said crank means rear portion from the second shoulder means prior to upward movement of said link means.

6. An earth working implement as set forth in claim 1 wherein the actuating means for pivoting the angular crank means of the lift-latch assembly upwardly-forwardly to raise the scarifier assembly from its extended to its retracted position includes a crank assembly pivotally mounted at the front end portion of the frame means of the scraper blade assembly for movement about a transverse axis forwardly of and substantially parallel to the pivot axis of the angular crank means of said lift-latch assembly, the crank assembly having a portion extending transversely of the implement for engagement with the underside of one of the lower links of the tractor rear lift mechanism whereby said crank assembly is adapted to pivot upwardly relative to said blade assembly upon raising of the tractor lift links, said crank assembly being biased rearwardly to maintain its transversely extending portion in engagement with the tractor lower lift link, said crank assembly having upstanding latch means, said lift-latch assembly including hook means pivotally attached to the front portion of said crank means of said assembly for movement about a transverse axis substantially parallel to said crank means pivot axis and projecting forwardly therefrom for engagement with the upstanding latch means of said crank assembly to connect the latter assembly to said lift-latch assembly whereby the scarifier assembly is pivoted from its extended to its retracted position upon lifting of said blade assembly, said lift-latch assembly including lift control means pivotally mounted on said frame means adjacent and forwardly of the latch means of said assembly for movement about a transverse axis substantially parallel to the pivot axis of said latch means and having pivotal connection with the hook means for movably supporting the same in coaction with its pivotal attachment to said crank means front portion, resilient means for urging said hook means upwardly to prevent its engagement with said upstanding latch means of said crank assembly, and actuating means for engaging one of the lift control and hook means for pivoting said hook means downwardly for engagement with said crank assembly latch means.

7. An earth working implement as set forth in claim 6 including lost motion means pivotally connecting the rear portion of the angular crank means of the lift-latch assembly to the link means of said assembly for permitting forward pivoting of said crank means relative to said link means upon initial lifting movement of said assembly to allow disengagement of said crank means rear portion from the second shoulder means prior to upward movement of said link means.

8. An earth working implement as set forth in claim 6 wherein the same resilient means maintains the latch means of the lift-latch assembly in position for engagement by the front portion of the crank means of said assembly and urges the hook means of said assembly upwardly to prevent its engagement with the upstanding latch means of the crank assembly.

9. An earth working implement as set forth in claim 8 wherein the latch means of the lift-latch assembly includes an element having upper and lower end portions with its transverse pivot axis therebetween, the frame means of the scraper blade assembly having means engageable by the upper end portion of the latch element to limit downward pivoting of said element, the front portion of the angular crank means of said lift-latch assembly being engageable with the lower end portion of said latch element upon upward-forward movement of said crank means whereby said element pivots upwardly to permit said crank means front portion to move forwardly thereof into locking engagement therewith.

10. An earth working implement as set forth in claim 9 including lost motion means pivotally connecting the rear portion of the angular crank means of the lift-latch assembly to the link means of said assembly for permitting forward pivoting of said crank means relative to said link means upon initial lifting movement of said assembly to allow disengagement of said crank means rear portion from the second shoulder means prior to upward movement of said link means.

11. An earth working implement as set forth in claim 9 including means pivotally supporting the latch actuating means of the lift-latch assembly for movement about a transverse axis substantially parallel to the pivot axis of the latch element of said assembly, said latch actuating means having a portion for engaging the upper end portion of said latch element to pivot said element upwardly against the resistance of the resilient means of said lift-latch assembly for releasing the front portion of the angular crank means of said assembly and thereby permit downward swinging of the scarifier assembly to its extended position.

12. An earth working implement as set forth in claim 11 including lost motion means pivotally connecting the rear portion of the angular crank means of the lift-latch assembly to the link means of said assembly for permitting forward pivoting of said crank means relative to said link means upon initial lifting movement of said assembly to allow disengagement of said crank means rear portion from the second shoulder means prior to upward movement of said link means.

13. An earth working implement as set forth in claim 6 wherein the lift control means of the lift-latch assembly is movable between a forward position supporting the hook means of said assembly in an elevated position and a rearward position supporting said hook means in a lowered position and being held in its forward and rearward positions by the hook resilient means, said lift control means having rearwardly directed cam means for engagement by the front portion of the angular crank means of said lift-latch assembly upon forward overtravel of said crank means past the latch means of said assembly when said lift control means is in its rearward position whereby the latter means is swung to its forward position to raise said hook means out of engagement with the upstanding latch means of the crank assembly to prevent possible damage when said lift-latch and crank assemblies are improperly positioned relative to each other, the hook actuating means of said lift-latch assembly being engageable with said lift control means for pivoting the latter from its forward to its rearward position to dispose the cam means in the path of said forwardly moving crank means of said assembly.

14. An earth working implement as set forth in claim 13 wherein the lift control means of the lift-latch assembly includes lost motion means between its cam means and its pivotal connection to the hook means of said assembly to permit relative movement of said cam means by the front portion of the angular crank means of said assembly and thereby allow locking engagement of said crank means with the upstanding latch means of the crank assembly when said lift-latch and crank assemblies are properly positioned relative to each other.

15. An earth working assembly as set forth in claim 13 wherein the upstanding latch means of the crank assembly is pivotally mounted and is biased rearwardly to facilitate engagement therewith of the hook means of the lift-latch assembly.

16. An earth working implement as set forth in claim 13 including lost motion means pivotally connecting the rear portion of the angular crank means of the lift-latch assembly to the link means of said assembly for permitting forward pivoting of said crank means relative to said link means upon initial lifting movement of said assembly to allow disengagement of said crank means rear portion from the second shoulder means prior to upward movement of said link means.

17. An earth working implement as set forth in claim 13 wherein the same resilient means maintains the latch means of the lift-latch assembly in position for engagement by the front portion of the crank means of said assembly and urges the hook means of said assembly upwardly to prevent its engagement with the upstanding latch means of the crank assembly.

18. An earth working implement as set forth in claim 13 wherein the latch means of the lift-latch assembly includes an element having upper and lower end portions with its transverse pivot axis therebetween, the frame means of the scraper blade assembly have means engageable by the upper end portion of the latch element to limit downward pivoting of said element, the front portion of the angular crank means of said lift-latch assembly being engageable with the lower end portion of said latch element upon upward-forward movement of said crank means whereby said element pivots upwardly to permit said crank means front portion to move forwardly thereof into locking engagement therewith.

19. An earth working implement as set forth in claim 13 including means pivotally supporting the latch actuating means of the lift-latch assembly for movement about a transverse, axis substantially parallel to the pivot axis of the latch element of said assembly, said latch actuating means having a portion for engaging the upper end portion of said latch element to pivot said element upwardly against the resistance of the resilient means of said lift-latch assembly for releasing the front portion of the angular crank means of said assembly and thereby permit downward swinging of the scarifier assembly to its extended position.

20. An earth working implement as set forth in claim 6 wherein common means is movable in opposite directions for actuating the latch means of the lift-latch assembly and for actuating one of the lift control and hook means of said assembly.

21. An earth working assembly as set forth in claim 6 wherein the upstanding latch means of the crank assembly is pivotally mounted and is biased rearwardly to facilitate engagement therewith of the hook means of the lift-latch assembly.

22. An earth working implement as set forth in claim 22 wherein the crank assembly includes means for adjusting the relative forward position of the upstanding latch means of said assembly in accordance with the movement of the lower links of the tractor rear lift mechanism relative to the implement.

23. An earth working implement as set forth in claim 6 wherein
the downward pivoting of the hook means of the lift-latch assembly by the hook actuating means permits engagement of said hook means by the upstanding latch means of the crank assembly whenever the scarifier assembly is in its extended position and the lower links of the tractor rear lift mechanism are in their lowered position.

24. An earth working implement as set forth in claim 6 wherein the lift-latch assembly includes
means for supporting the hook means of said assembly upon downward pivoting of said hook means by its actuating means when the scarifier assembly is in its extended position and the lower links of the tractor rear lift mechanism are in their raised position,
said hook means and the upstanding latch means of the crank assembly having coacting means to guide said latch means into locking engagement with said hook means upon subsequent lowering of the tractor lift links.

25. An earth working implement as set forth in claim 1 wherein the acttuating means for pivoting the angular crank means of the lift-latch assembly upwardly-forwardly to raise the scarifier assembly from its extended to its retracted position includes
lever means having connection with said crank means for lifting the same to move its forward portion into locking engagement with the latch means.

References Cited
UNITED STATES PATENTS

| | | | |
|---|---|---|---|
| 2,839,851 | 6/1958 | Geiszler | 172—197 |
| 2,865,117 | 12/1958 | Davis et al. | 172—197 |
| 3,069,791 | 12/1962 | French | 172—197 |
| 3,101,790 | 8/1963 | Rice | 172—494 X |

ANTONIO F. GUIDA, Primary Examiner

WALTER J. CONLON, Assistant Examiner

U.S. Cl. X.R.

172—480, 444, 494, 744